United States Patent
Michalak

(10) Patent No.: US 7,772,721 B2
(45) Date of Patent: Aug. 10, 2010

(54) METHOD AND APPARATUS FOR CONSERVING ENERGY STORED IN BYPASS CAPACITORS DURING DYNAMIC POWER COLLAPSE

(75) Inventor: Gerald Paul Michalak, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 11/866,736

(22) Filed: Oct. 3, 2007

(65) Prior Publication Data

US 2009/0091188 A1    Apr. 9, 2009

(51) Int. Cl.
*H02J 1/10* (2006.01)
(52) U.S. Cl. .......................................... 307/109; 307/43
(58) Field of Classification Search ................... 307/43, 307/109; 320/167
See application file for complete search history.

(56) References Cited

U.S. PATENT DOCUMENTS

| | | | |
|---|---|---|---|
| 6,097,973 A * | 8/2000 | Rabe et al. | 455/572 |
| 6,618,296 B2 | 9/2003 | Zhang | |
| 6,646,842 B2 | 11/2003 | Pan et al. | |
| 6,683,767 B2 * | 1/2004 | Ito et al. | 361/56 |
| 6,815,935 B2 | 11/2004 | Fujii | |
| 6,831,447 B1 | 12/2004 | Wittenberg | |
| 6,864,708 B2 | 3/2005 | Takahashi et al. | |
| 7,126,391 B1 * | 10/2006 | Smith et al. | 327/143 |
| 2003/0038669 A1 | 2/2003 | Zhang | |
| 2003/0107859 A1 | 6/2003 | Pan et al. | |
| 2006/0145673 A1 | 7/2006 | Fogg et al. | |

FOREIGN PATENT DOCUMENTS

| GB | 2332575 | 6/1999 |
|---|---|---|
| WO | 0137414 | 5/2001 |

OTHER PUBLICATIONS

Sherman L: "Regulated Energy. Oreducing the Cell Count for Potable Products in an Ongoing Activity. Taking a Closer Look at Voltage Regulators Could be the Answer" New Electronics, International Thomson Publishing, London, GB, vol. 29, No. 11, Jun. 11, 1996, p. 29/30, XP000623656 ISSN: 0047-9624 figure 1 col. 3, paragraph 2.
International Search Report-PCT/US2008/078602, International Search Authority-European Patent Office Aug. 13, 2009.
Written Opinion-PCT/US2008/078602, International Search Authority-European Patnet Office Aug. 13, 2009.

* cited by examiner

*Primary Examiner*—Albert W Paladini
*Assistant Examiner*—Hal I Kaplan
(74) *Attorney, Agent, or Firm*—Peter M. Kamarchik; Nicholas J. Pauley; Sam Talpalatsky

(57) ABSTRACT

Energy stored in bypass capacitors in a portable device may be conserved when a power supply voltage is collapsed reducing the need to recharge the bypass capacitors and thereby saving power. A bypass charge saving circuit includes a bypass capacitor, a power source having an output supply voltage that is switchable, a load circuit of the portable device coupled to the output supply voltage, and the bypass capacitor operable to filter the output supply voltage. Also, a transistor switch is operable to decouple a discharge path of the bypass capacitor through the load circuit when the transistor switch is disabled. Further, a controller is operable to turn off the output supply voltage and the transistor switch in order to conserve energy stored in the bypass capacitor.

20 Claims, 14 Drawing Sheets ined circuits and processing systems, collapse.

METHOD AND APPARATUS FOR CONSERVING ENERGY STORED IN BYPASS CAPACITORS DURING DYNAMIC POWER COLLAPSE

FIELD OF THE DISCLOSURE

The present disclosure relates generally to the field of power control in integrated circuits and processing systems, and more specifically, to conservation of energy stored in bypass capacitors during dynamic power collapse.

BACKGROUND

Many portable products, such as cell phones, laptop computers, personal data assistants (PDAs) or the like, utilize a processor executing programs, such as, communication and multimedia programs. The processing system for such products may include a processor complex for processing instructions and data. The functional complexity of such portable products, other personal computers, and the like, requires high performance processors and memory. At the same time, portable products have a limited energy source in the form of batteries and are often required to provide high processing performance at reduced power levels to meet functional requirements and increase battery life. Many personal computers are also being developed to provide high performance at low power drain to reduce overall energy consumption.

Internal to an electronic complex are circuits and subsystems which may be operative only for specific functions, such as subsystems for image and video processing, audio processing, communication signal processing, and functions not requiring continuous operation. By dividing the electronic complex into functional power domains, the various circuits and subsystems may be powered separately and a power supply voltage may be collapsed when the functional operations of a particular power domain are not presently required.

Each functional power domain may use bypass capacitors in order to reduce noise on the power supply voltage. One consequence of collapsing the supply voltage is that the bypass capacitance is discharged thereby requiring additional power use to charge these bypass capacitors when the power domain is brought back up to operating voltage levels.

SUMMARY

The present inventions recognize that reducing power requirements in a processor complex is important to portable applications and in general for reducing power use in processing systems. It is also recognized that conserving the energy stored in bypass capacitors when a power supply voltage is collapsed reduces the need to recharge the bypass capacitors thereby saving power. To such ends, an embodiment of the invention addresses an apparatus to save power in a portable device. The apparatus includes a bypass capacitor, a power source having an output supply voltage that is switchable, a load circuit of the portable device coupled to the output supply voltage, the bypass capacitor operable to filter the output supply voltage, and a transistor switch operable to decouple a discharge path of the bypass capacitor through the load circuit when the transistor switch is disabled. Further, a controller is operable to turn off the output supply voltage and the transistor switch in order to conserve energy stored in the bypass capacitor.

Another embodiment addresses a method of conserving energy stored in a bypass capacitor of a load circuit in a portable device. A first signal to the load circuit is asserted to hold the load circuit in a reset state. A voltage source used to supply a voltage to the load circuit is disabled after a first period of time following the asserting of the first signal. The bypass capacitor is decoupled from the load circuit after a second period of time following the asserting of the first signal, to minimize the discharging of the bypass capacitor through the load circuit. By this process, the energy stored in the bypass capacitor is conserved.

A further embodiment addresses a method for conserving energy stored in a plurality of bypass capacitors associated with a plurality of power domains of circuitry in a portable device. One or more power down events are generated separately for one or more power domains. The one or more power domains to be powered down are held in a controlled non-functional state in response to a power down event. Bypass capacitors associated with the one or more power domains to be powered down are decoupled from their associated load and the supply voltage to the one or more power domains to be powered down is disabled.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
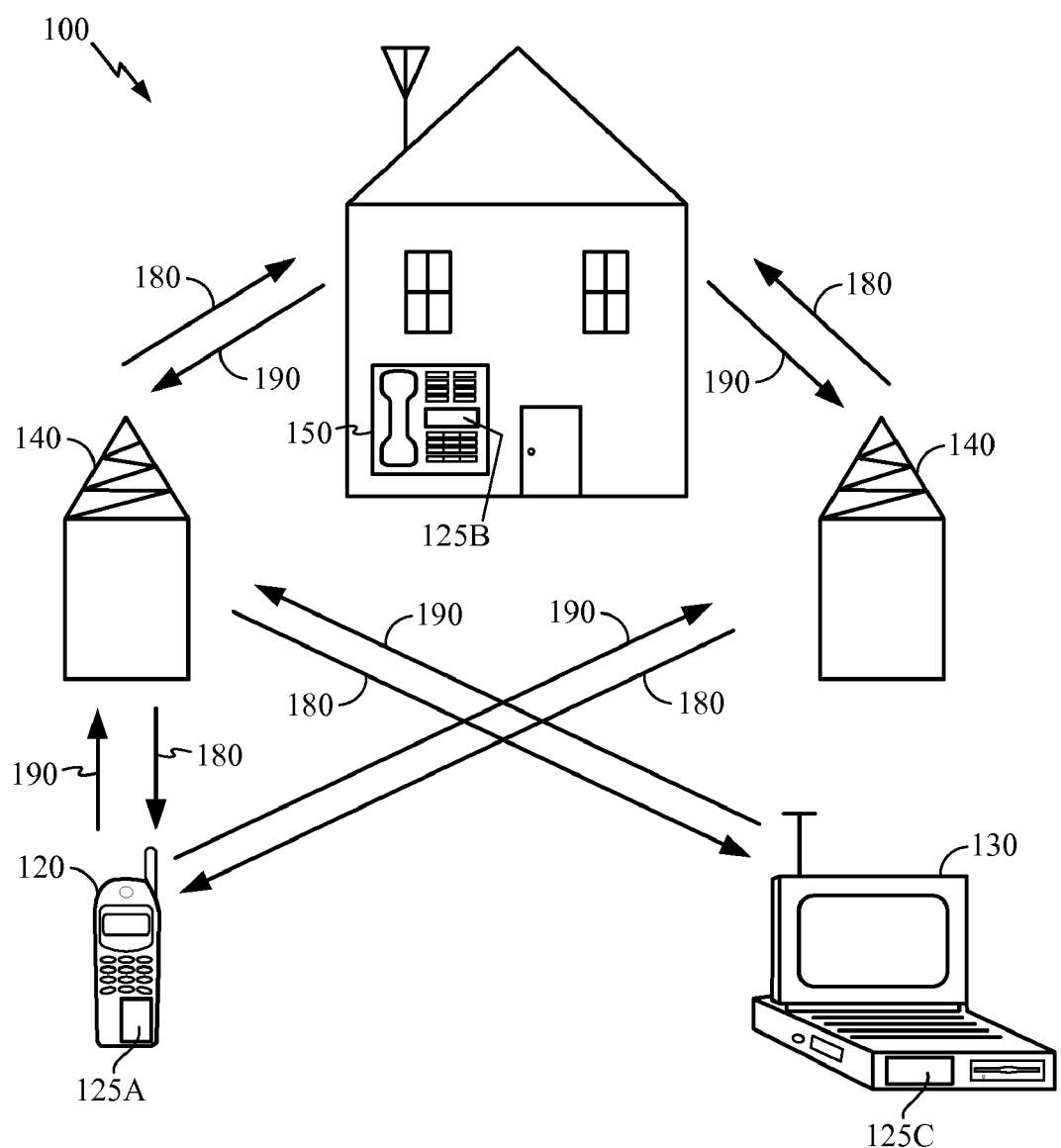
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, and 150 include hardware components, software components, or both as represented by components 125A, 125C, and 125B, respectively, which have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having a switchable voltage source and a load circuit having one or more bypass capacitors, such as may be used to supply power to a processor and its supporting peripheral devices.

Figure 2:
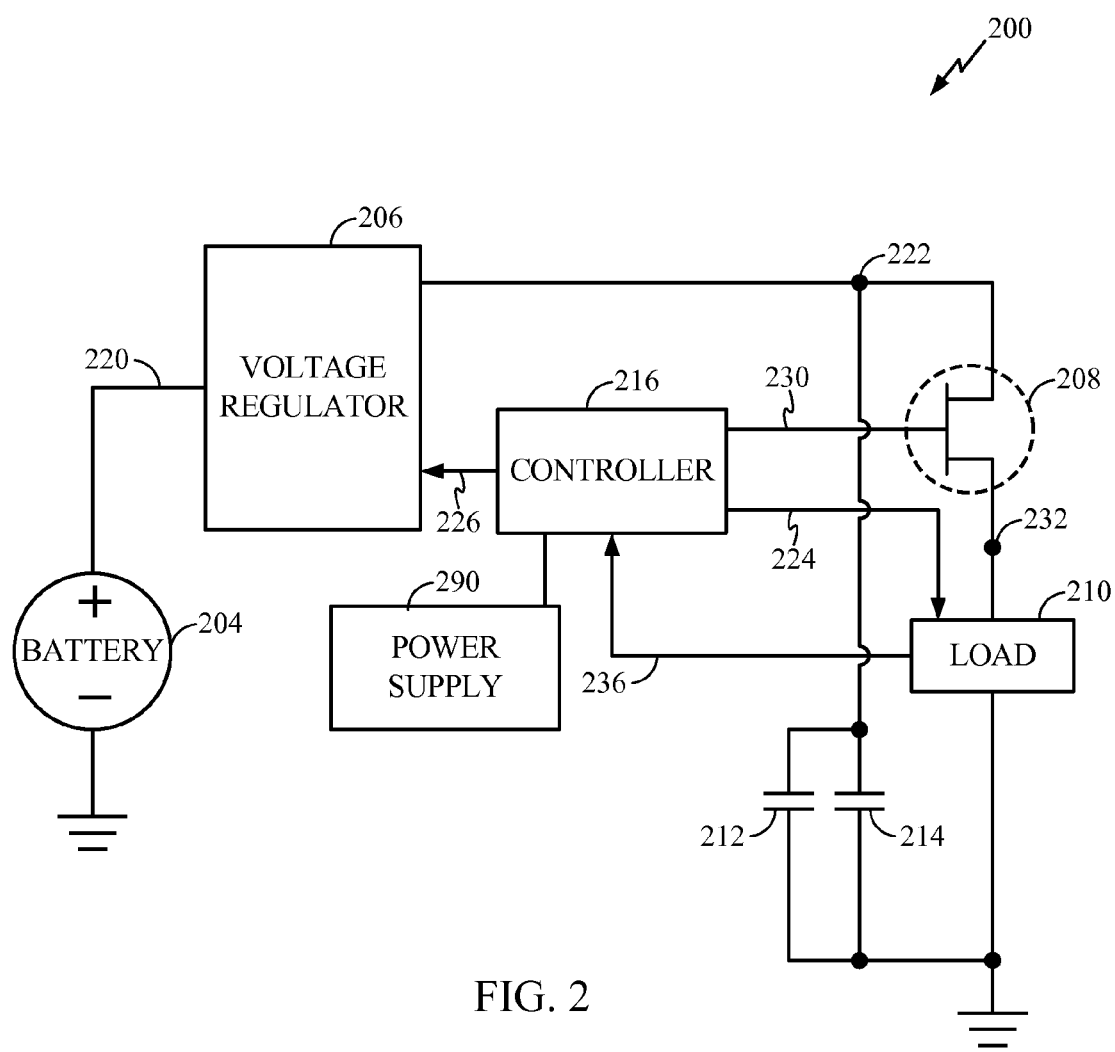
FIG. 2 is an exemplary first embodiment of a bypass charge saving (BCS) circuit which may be used in a mobile device, such as a mobile phone.

FIG. 2 is an exemplary first embodiment of a bypass charge saving (BCS) circuit 200 which may be used in a remote unit 120, such as a mobile phone. The BCS circuit 200 comprises a source of power, such as battery 204, a voltage regulator 206, a transistor switch 208, a load circuit 210, such as a processor complex, one or more bypass capacitors, such as bypass capacitors 212 and 214, and a controller 216. The battery 204 supplies a voltage 220 to the voltage regulator 206 which generates a switchably controlled and regulated supply voltage 222 that is coupled to the load circuit 210 by transistor switch 208. The bypass capacitors 212 and 214 filter the supply voltage 222 to minimize noise interference with the load circuit 210. For example, bypass capacitors 212 and 214 may have a combined capacitance of 46 micro-farads (µF). In another example, more than two bypass capacitors may be used, such as using four bypass capacitors having capacitance values of 22 µF, 22 µF, 4.7 µF, and 4.7 µF. The controller 216 provides a power reset signal 224 to the load circuit 210, a voltage regulator (Vreg) enable signal 226 to the voltage regulator 206, and a bypass signal 230 to the transistor switch 208. The transistor switch 208 is used to conserve the energy stored on the bypass capacitors 212 and 214 when power may be collapsed to save power when the load circuit 210 operation may not be required. By controlling the timing between the power reset signal 224, the voltage regulator enable signal 226, and the bypass signal 230, the controller 216 is able to control the amount of energy saved in the bypass capacitors 212 and 214. It is also noted that the voltage regulator 206 may control the supply voltage 222 to limit in rush current to the load circuit 210 and bypass capacitors 212 and 214.

The controller 216 is separately supplied power 290 independent of the supply voltage 222 and holds the load circuit 210 in reset until a load supply voltage 232 has reached a sufficient voltage level to properly operate the load circuit 210. The battery 204 may be of varying types, such as a rechargeable battery. It is further noted that the voltage regulator 206 may receive an input voltage from a voltage supply external to the portable device where the input voltage is the same voltage level as a recharged battery.

Figure 3:
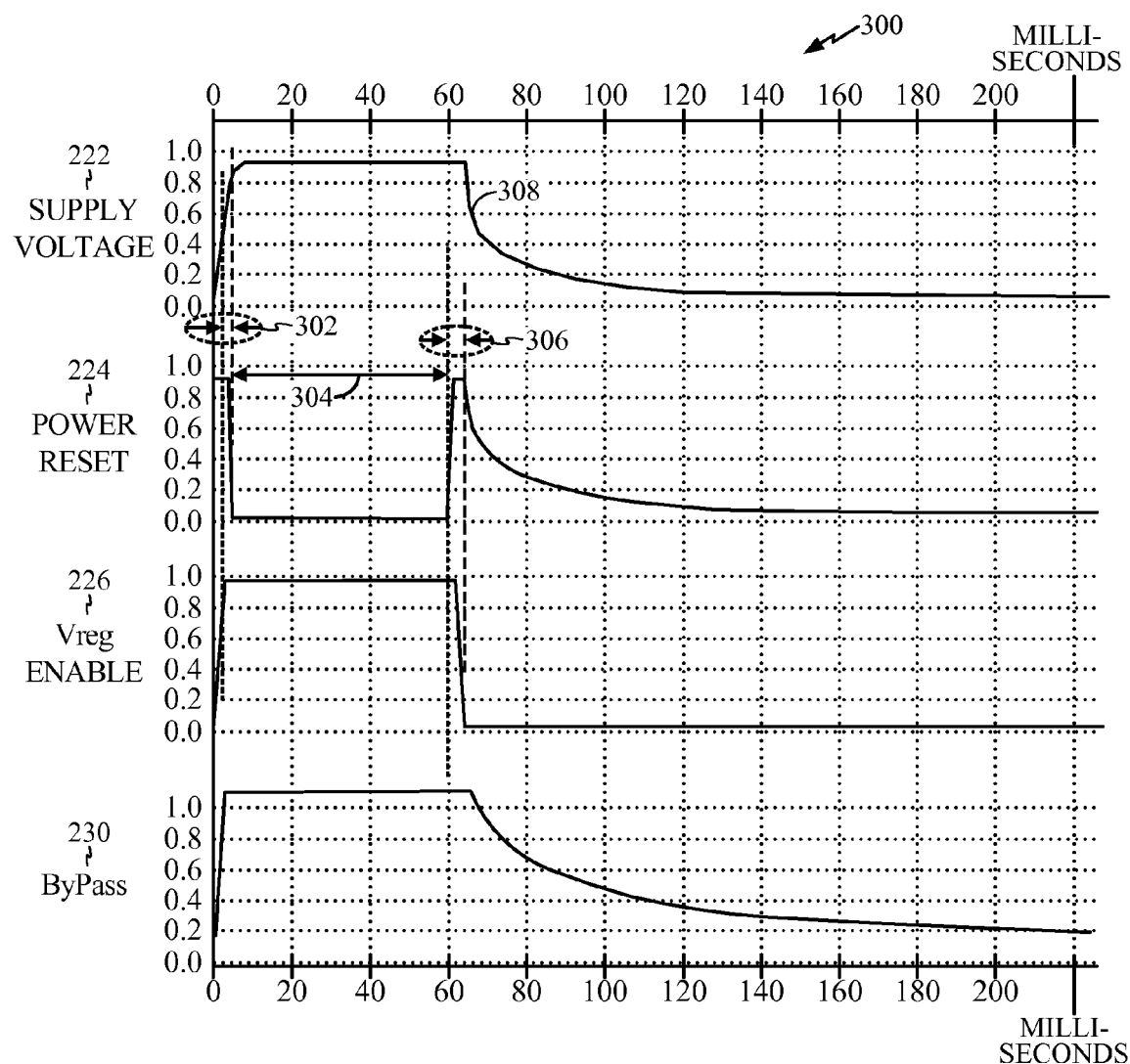
FIG. 3 illustrates a first timing diagram of signal operations of the BCS circuit of FIG. 2.

FIG. 3 illustrates a first timing diagram 300 of signal operations of the BCS circuit 200 of FIG. 2. The first timing diagram 300 illustrates, for example, turning on the voltage to the load 210, operating the load for a period of time, and then turning off the voltage to the load 210. In the example scenario depicted in FIG. 3, the bypass capacitors 212 and 214 are charged when the voltage to the load 210 is turned on and allowed to discharge when the voltage to the load 210 is turned off.

Prior to bringing up the supply voltage 232 to the load circuit 210, the controller 216 asserts a power reset signal 224, shown at a high voltage level and at a relative time zero, to hold the load circuit 210 in a reset state until the load supply voltage 232 is up to a normal operating voltage level. The controller 216 then asserts a voltage regulator (Vreg) enable signal 226 which causes the voltage regulator to ramp up its output voltage to the desired voltage. Generally, the voltage regulator 206 is either on or off as controlled by an external signal, such as the Vreg enable signal 226. In one example scenario, the controller also brings up the bypass signal 230 at the same time as the Vreg enable signal 226. After the load supply voltage 232 has reached a normal operating voltage level, the controller 216 turns off the reset signal thereby enabling operation of the load circuit 210.

The load supply voltage 232 may be determined to be at a normal operating voltage level by measuring the voltage at the point labeled 232, for example, or by allocating a time 302 which generally accounts for bringing up the supply voltage. The load circuit 210 may then operate for a period of time 304 until it is determined that power should be turned off to the load circuit 210, such as when the function of the load circuit 210 is not required. To turn the load supply voltage 232 off, first the power reset signal 224 is asserted and a period of time 306 later the Vreg enable signal 226 is turned off. In response to the Vreg signal 226 being turned off, the voltage regulator 206 turns off and the voltage held in the bypass capacitors 212 and 214 dissipates through the load circuit 210. The dissipation curve 308 is similar to an exponential discharge curve though the discharge curve may vary depending upon the circuitry used in the load circuit 210. In addition, the control signal voltages 224 and 230 may decay with the load supply voltage 232, due to a clamping circuit or other circuit employed with the control signals, such as used when a signal crosses a voltage domain, for example. When the load circuit 210 is turned back on, the bypass capacitors 212 and 214 will recharge and it is noted that the charging of the bypass capacitors may account for 1 percent or more of the power utilized in the BCS circuit 200.

Figure 4:
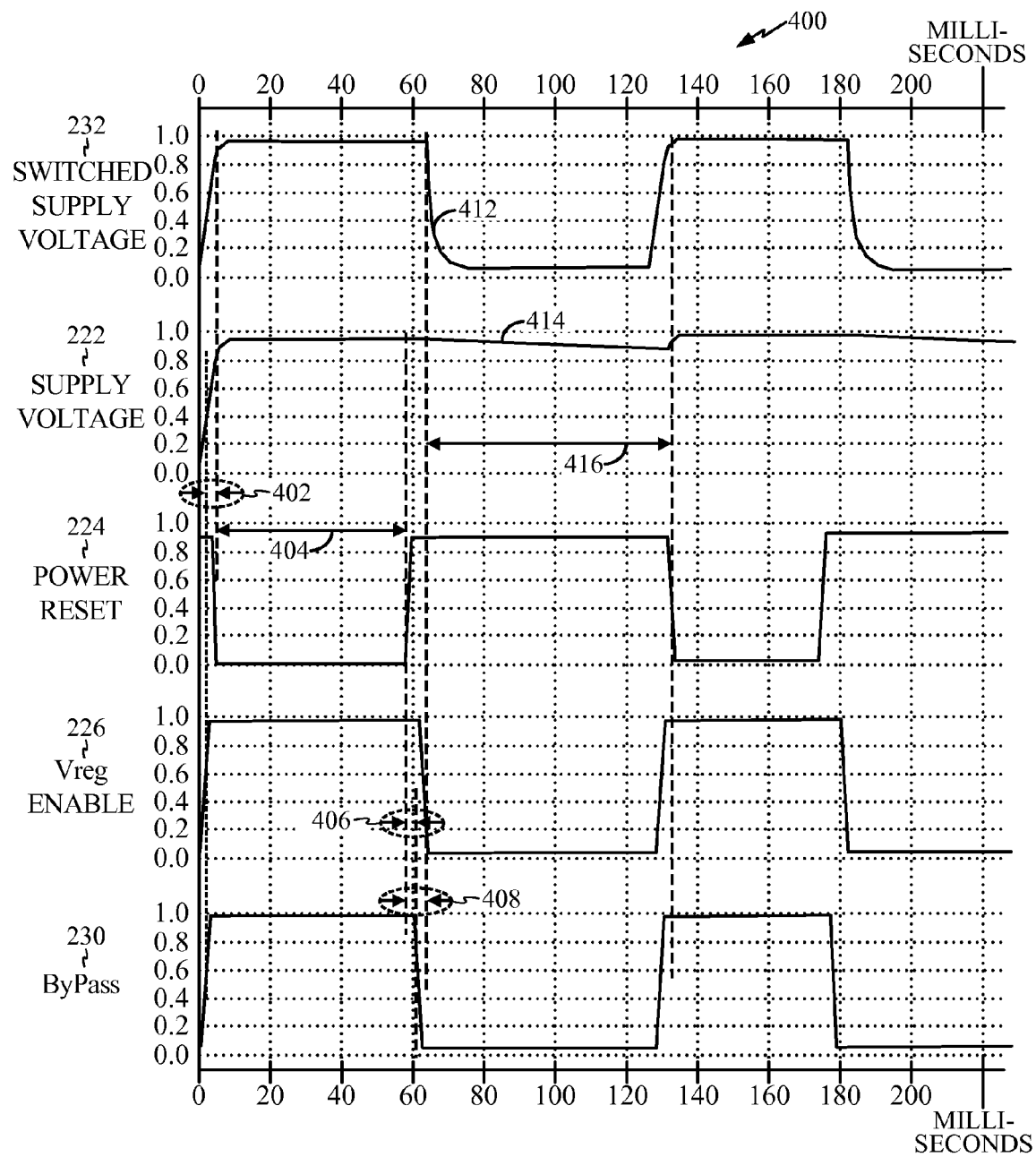
FIG. 4 illustrates a second timing diagram of signal operations of the BCS circuit of FIG. 2.

FIG. 4 illustrates a second timing diagram 400 of signal operations of the BCS circuit 200 of FIG. 2. The second timing diagram 400 illustrates, for example, turning the voltage on and off to the load 210 depending upon the load circuit's utilization in order to conserve power when the operation of the load circuit 210 is not required. For example, if the load circuit 210 is one of a plurality of processor complexes making up a device, such as a remote unit 120 of FIG. 1, and load circuit 210 supports a specific function, such as image processing from a camera on the remote unit 120, then, for example, power may be cycled to the load circuit 210 between camera snapshots. Prior to bringing up the supply voltage 222 and enabling the coupling to the load circuit 210, the controller 216 activates a power reset signal 224 to hold the load circuit 210 in a reset state until the load supply voltage 232 is up to a normal operating voltage level. The controller 216 then asserts a voltage regulator (Vreg) enable signal 226 to turn on and bring the supply voltage 222 on line. The controller 216 also activates the bypass signal 230 to turn on the transistor switch 208 bringing up the load supply voltage 232. After the load supply voltage 232 has reached the normal operating voltage level, the controller 216 turns off the power reset signal 224 thereby enabling operation of the load circuit 210.

The load supply voltage 232 may be determined to be at a normal operating voltage level by measuring the voltage at the load supply voltage point labeled 232, for example, or by allocating a period of time 402 which generally accounts for bringing up the supply voltage. The load circuit 210 may then operate for a period of time 404 until the load circuit 210 or an alternative circuit (not shown) determines that power should be turned off to the load circuit 210. For example, in an alternative embodiment, the load circuit 210 may assert a power down request signal 236 to the controller 216 to indicate that the power to the load circuit 210 could be turned off. In this alternative embodiment, the load circuit 210 may consist of a processor complex that asserts the power down request signal 236 when the processor complex is in an idle operating state.

To turn the load supply voltage 232 off, the power reset signal 224 is asserted, and a first period of time 406 later the bypass signal 230 is turned off, and after a second period of time 408, the Vreg enable signal 226 is also turned off. At this point, both the transistor switch 208 and the voltage regulator 206 have been turned off, and the energy stored in the bypass capacitors 212 and 214 is conserved. By controlling the timing between the power reset signal 224, the voltage regulator enable signal 226, and the bypass signal 230, the controller 216 is able to control the amount of energy saved in the bypass capacitors. For example, if the Vreg enable signal 226 is turned off prior to the bypass signal 230 being turned off, the bypass capacitors 212 and 214 may begin to discharge. If the time between turning off the Vreg enable signal 226 and the bypass signal 230 is kept short, only minimum energy stored in the bypass capacitors may be lost even in this situation and still provide an advantage for energy conservation.

After the transistor switch 208 is turned off, the load supply voltage 232 is dissipated through the load circuit 210, as shown by dissipation curve 412. The supply voltage 222 dissipation curve 414 is a function of the non-ideal characteristics of transistor switch 208 and internal circuitry of the voltage regulator 206, the total capacitance of the bypass capacitors 212 and 214, and the self dissipation of the capacitors. Bypass capacitors without a discharge path may hold a voltage value close to the normal operating voltage for 2 or more seconds, thereby conserving the energy stored therein. The operating characteristics of a load circuit 210 may be such that it is turned on and off in periods of time less than 2 seconds, such as the time period 416. By saving the energy stored on the bypass capacitors, 1 percent or more of the power utilized in the BCS circuit 200 may be saved.

Figure 5:
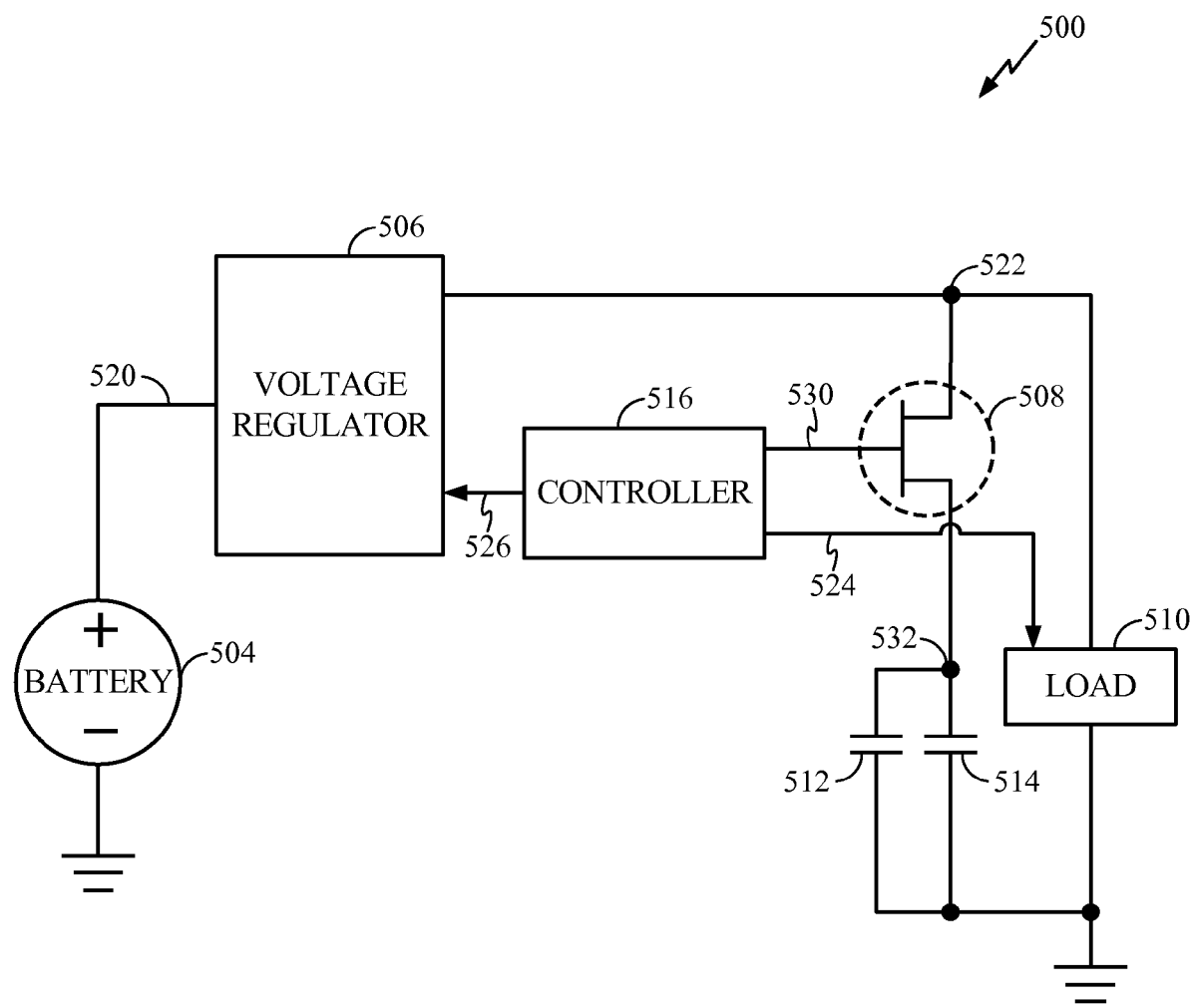
FIG. 5 is an exemplary second embodiment of a BCS circuit.

FIG. 5 is an exemplary second embodiment of a BCS circuit 500. The BCS circuit 500 is similar to the BCS circuit 200 of FIG. 2 with one of the distinctions being the placement of a transistor switch to break the bypass capacitor's discharge path. In the BCS circuit 200, the transistor switch 208 is placed to controllably decouple the bypass capacitors' discharge path by decoupling the supply voltage 222 to the load circuit 210. In the BCS circuit 500, a transistor switch 508 is placed to controllably decouple a bypass capacitors' discharge path by decoupling the bypass capacitors coupling to a supply voltage 522. In general, the BCS circuit 500 may have a voltage source, such as battery 504, a voltage regulator 506, a load circuit 510, a controller 516, and a transistor switch 508 as appropriate for the BCS circuit 500 implementation. The battery 504 supplies a voltage 520 to the voltage regulator 506 that generates the switchably controlled and regulated supply voltage 522 that is coupled to the load circuit 510. Bypass capacitors 512 and 514 filter the supply voltage 522 to minimize noise interference with the load circuit 510.

Figure 6:
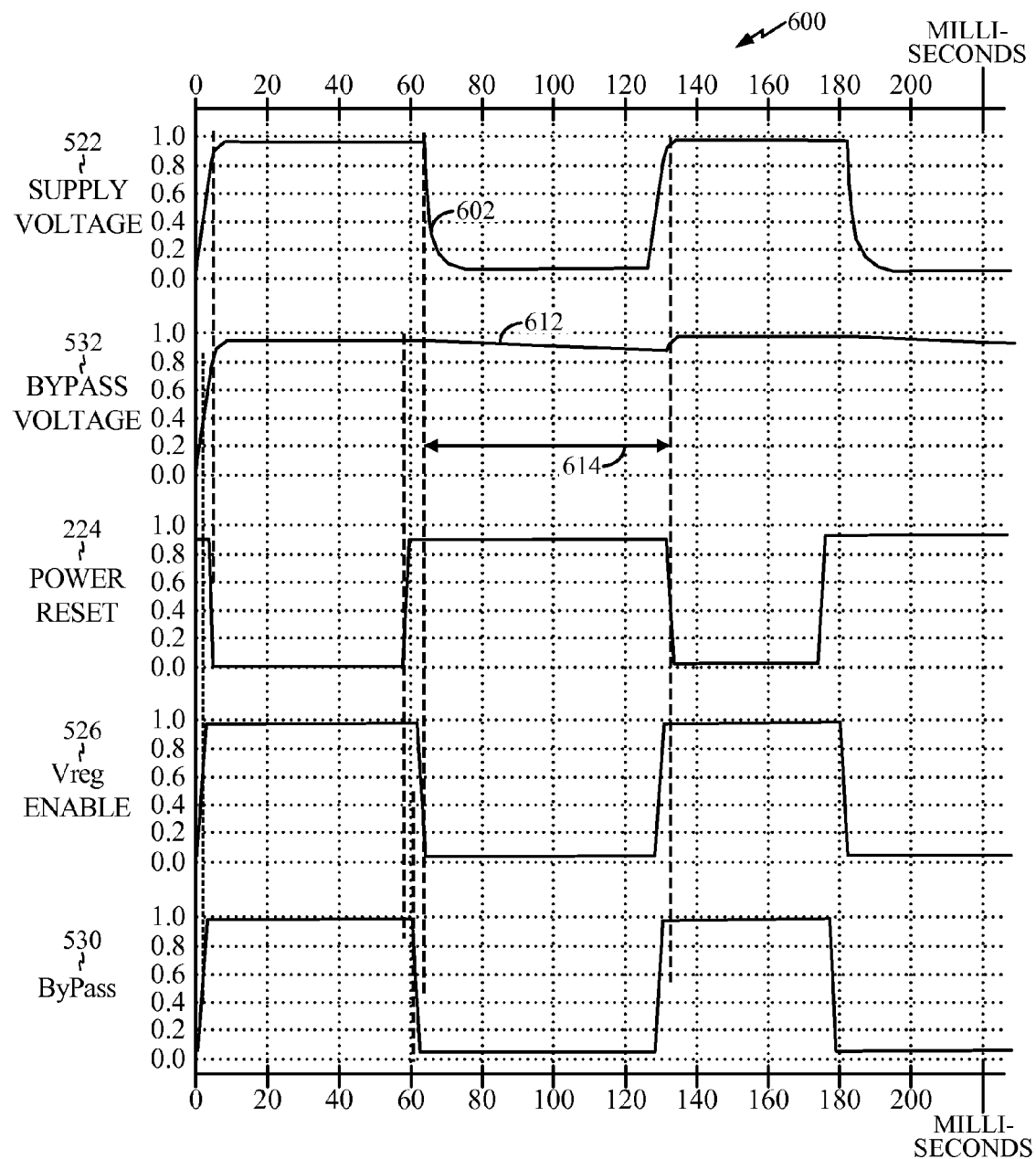
FIG. 6 illustrates a timing diagram of signal operations of the BCS circuit of FIG. 5.

FIG. 6 illustrates a timing diagram 600 of signal operations of the BCS circuit 500 of FIG. 5 showing the relationship of the supply voltage 522 and bypass voltage 532 with the timing signals provided by the controller 516. In FIG. 6, the timing of the power reset signal 524, Vreg enable signal 526, and the bypass signal 530 is similar to the timing illustrated in timing diagram 400 of FIG. 4. As illustrated in FIG. 6, the supply voltage 522 discharge generally follows an exponential curve, such as dissipation curve 602, while the bypass voltage 532 remains close to the original supply voltage during period of time 614, as illustrated with a dissipation curve 612. The bypass voltage 532 dissipation curve 612 is primarily a function of the non-ideal characteristics of transistor switch 508, the total capacitance of the bypass capacitors 512 and 514, and the self dissipation of the capacitors.

Figure 7:
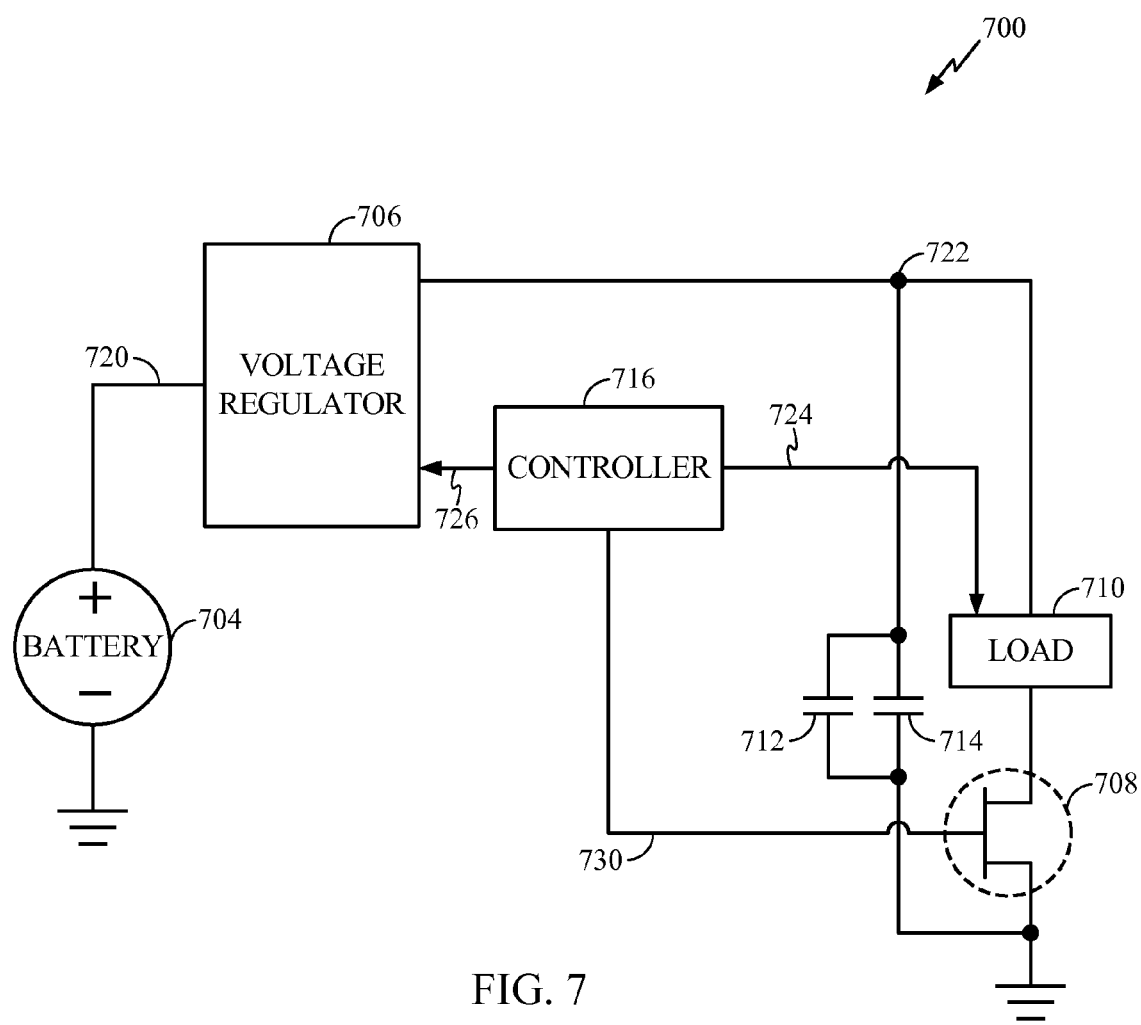
FIG. 7 is an exemplary third embodiment of a BCS circuit.

FIG. 7 is an exemplary third embodiment BCS circuit 700. The BCS circuit 700 is similar to the BCS circuit 200 of FIG. 2, with one of the distinctions being the placement of a transistor switch to break the bypass capacitor's discharge path. For example, some transistor switches operate more efficiently at higher voltages as opposed to lower voltages. With such a transistor switch, the BCS circuit 200 may be used. For transistors that operate more efficiently at lower voltages, the BCS circuit 700 may be used. A transistor switch 708 is placed at the "foot" of the load circuit 710 to controllably decouple the ground connection to the load circuit 710. By decoupling the ground connection to the load circuit 710, the transistor switch 708 also decouples the bypass capacitors' discharge path for the energy stored in the bypass capacitors 712 and 714. In FIG. 7, the timing of the power reset signal 724, Vreg enable signal 726, and the bypass signal 730 remain similar to the corresponding signal timing illustrated in the timing diagram of FIG. 4. The supply voltage 722 follows, in a similar manner, the timing of the supply voltage 222 of FIG. 2 as illustrated in FIG. 4. In general, the BCS circuit 700 may have a voltage source, such as battery 704, a voltage regulator 706, a load circuit 710, a controller 716, and a transistor switch 708 as appropriate for the BCS circuit 700 implementation. The battery 704 supplies a voltage 720 to the voltage regulator 706 that generates the switchably controlled and regulated supply voltage 722 that is coupled to the load circuit 710. Bypass capacitors 712 and 714 filter the supply voltage 722 to minimize noise interference with the load circuit 710.

Figure 8:
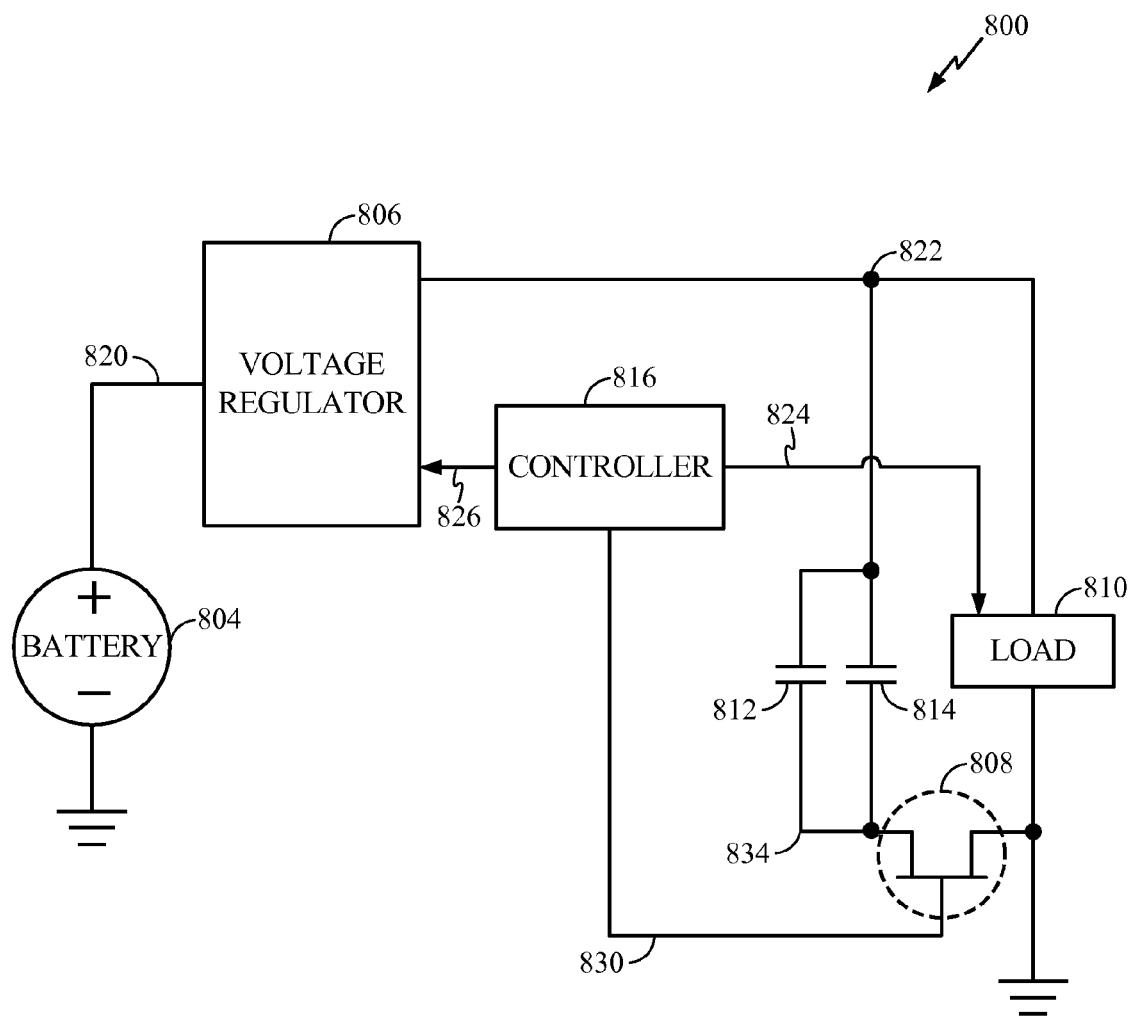
FIG. 8 is an exemplary fourth embodiment of a BCS circuit.

FIG. 8 is an exemplary fourth embodiment of a BCS circuit 800. The BCS circuit 800 is similar to the BCS circuit 200 of FIG. 2, with one of the distinctions being the placement of a transistor switch to break the bypass capacitor's discharge path. In the BCS circuit 800, the transistor switch 808 is placed to controllably decouple the bypass capacitors' discharge path by decoupling the ground connection to the capacitors. In FIG. 8, the timing of the power reset signal 824, Vreg enable signal 826, and the bypass signal 830 are similar to the timing diagram of corresponding signals shown in FIG. 4. The supply voltage 822 follows, in a similar manner, the timing of the supply voltage 222 of FIG. 2 as illustrated in FIG. 4. The signal point 834, when the transistor switch 808 is turned off, transitions to a negative voltage comparable in magnitude to the supply voltage 822 when supplying power to the load circuit 810. In general, the BCS circuit 800 may have a voltage source, such as battery 804, a voltage regulator 806, a load circuit 810, a controller 816, and a transistor switch 808 as appropriate for the BCS circuit 800 implementation. The battery 804 supplies a voltage 820 to the voltage regulator 806 that generates the switchably controlled and regulated supply voltage 822 that is coupled to the load circuit 810. Bypass capacitors 812 and 814 filter the supply voltage 822 to minimize noise interference with the load circuit 810.

Each of the controllers, 216, 516, 716, and 816, provide a time sequence of signals which control the reset signal to the load, the enable of the voltage regulator, and the coupling of the bypass capacitance. The values of the time delays between the control signals involved depend on the specifics of the voltage regulator, load circuit, and the bypass capacitance. One of the purposes of the controller is to provide a set of control signals in the proper time sequence for controlling the power up and power down transitions of the supply voltage to the load circuit to conserve power. A control function of the controller may be implemented in a number of ways. For example, the control function could be implemented as a software controller algorithm running on a separate processor that remains powered up to control the power sequencing of a particular load circuit. Alternatively, the controller can be implemented using non-programmable circuit elements, such as, comparators, inductors, resistors, capacitors, and logic gates. Also, the controller may be powered by a voltage regulator that is separate from the controller or controllers for each load circuit. The controller may alternatively be powered directly from the battery and consist of analog and digital circuits that can operate from typical battery voltages, such as 3.4 to 4.4 volts.

Figure 9A:
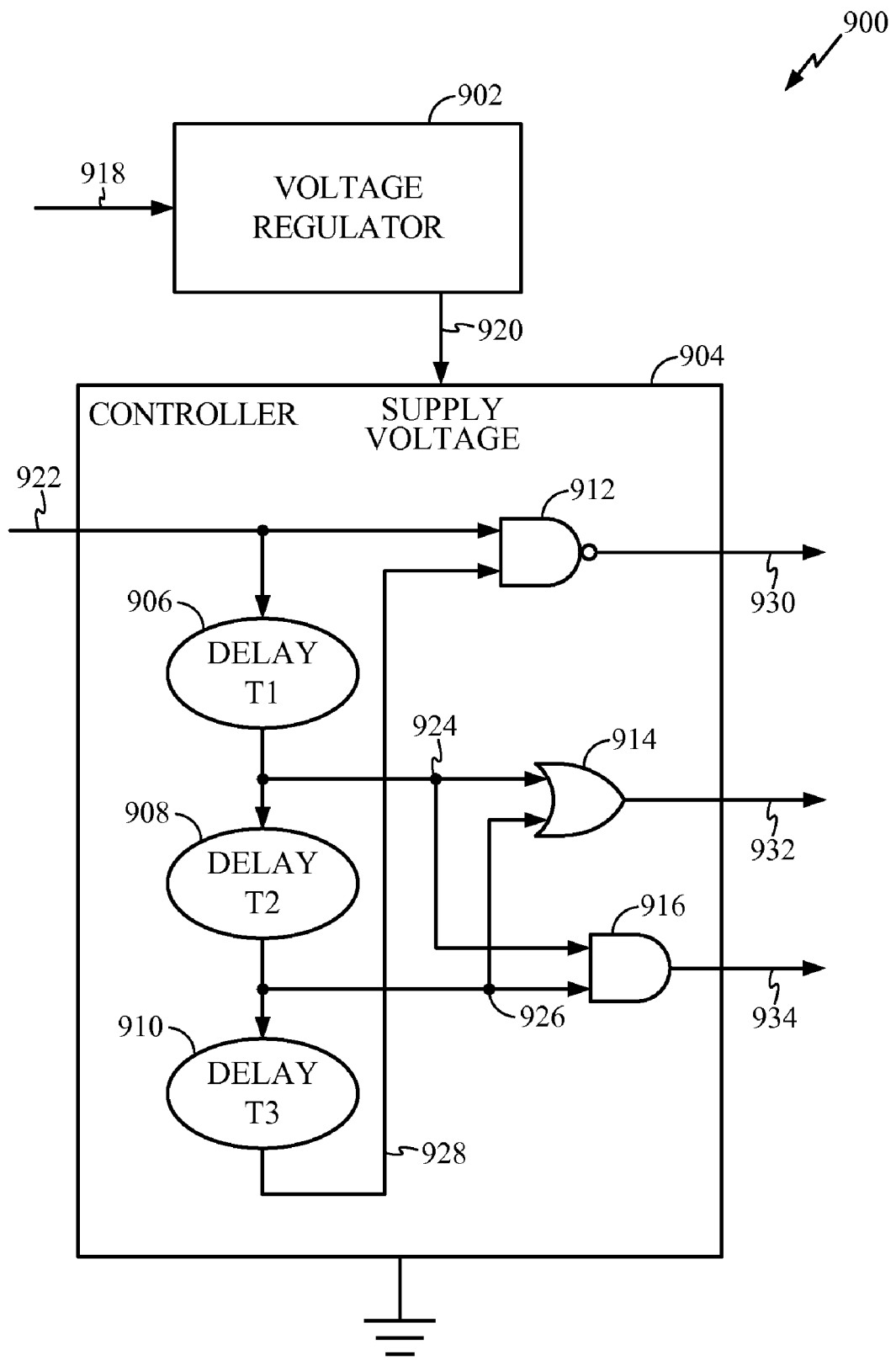
FIG. 9A is an exemplary first embodiment of a controller subsystem.

FIG. 9A is an exemplary first embodiment of a controller subsystem 900. The first controller subsystem 900 consists of a voltage regulator 902 and a controller circuit 904, such as controllers 216, 516, 716, and 816. The controller circuit further comprises three sequentially coupled delay elements, delay T1 906, delay T2, 908, and delay T3 910, and logic gates, NAND gate 912, OR gate 914 and AND gate 916.

In order to operate the controller circuit 904, a source voltage 918 is provided by a battery, for example, as a power source for the voltage regulator 902 which provides a supply voltage 920 to the controller circuit 904. The controller circuit 904 receives a power control signal 922 from a separate circuit that initiates a power up and a power down sequence of the particular load circuit under control of controller circuit 904. The power control signal 922 progresses through the three delay elements producing delay T1 signal 924, delay T2 signal 926, and delay T3 signal 928. The NAND gate 912 receives the power control signal 922 and the delay T3 signal 928 as inputs to produce a power reset signal 930, such as the power reset signal 224 of FIG. 2. The OR gate 914 receives the delay T1 signal 924 and the delay T2 signal 926 as inputs to produce a voltage regulator (Vreg) enable signal 932, such as the Vreg enable signal 226 of FIG. 2. The AND gate 916 receives the delay T1 signal 924 and the delay T2 signal 926 as inputs to produce a bypass signal 934, such as the bypass signal 230 of FIG. 2.

Figure 9B:
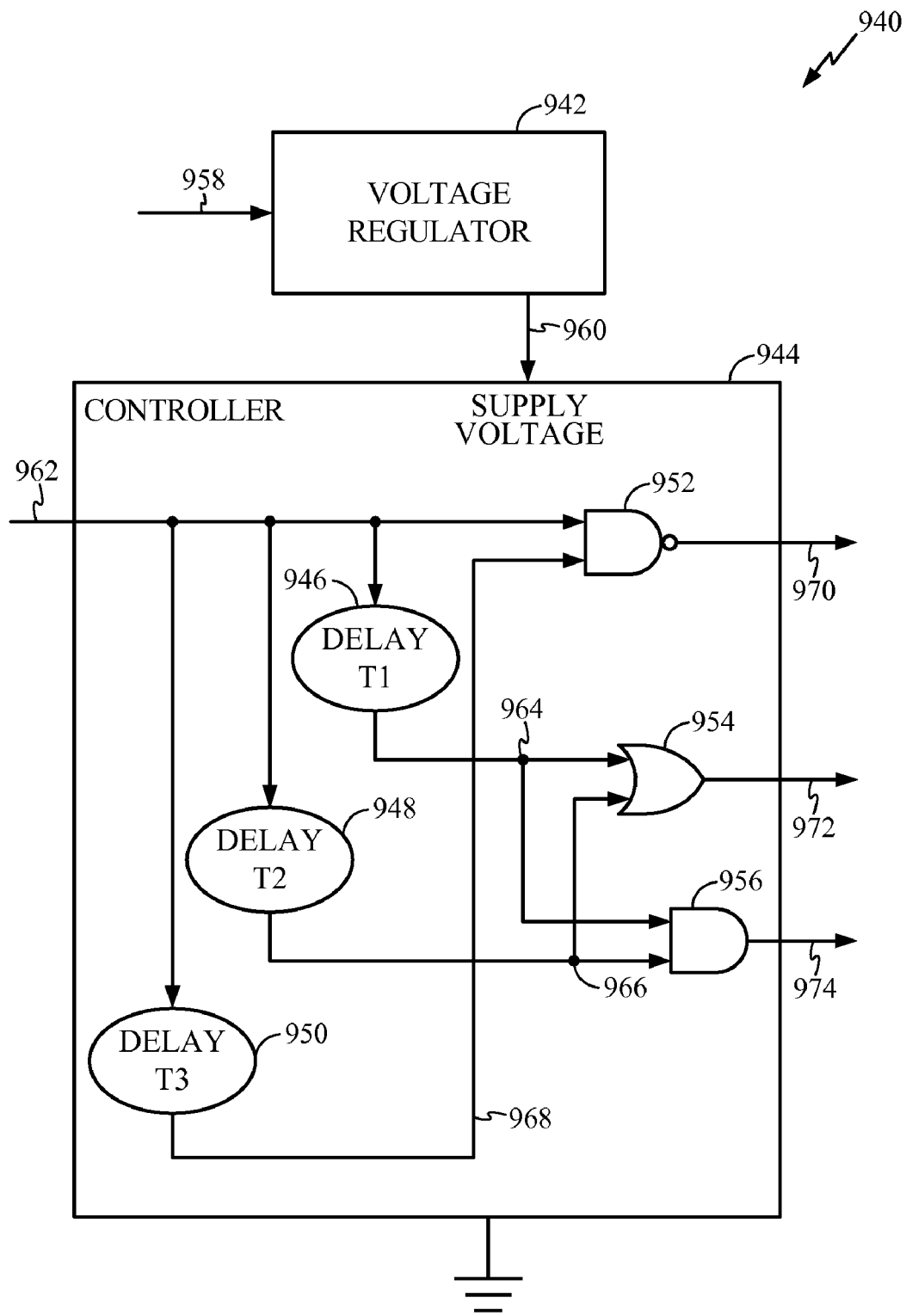
FIG. 9B is an exemplary second embodiment of a controller subsystem.

FIG. 9B is an exemplary second embodiment of a controller subsystem 940. The second controller subsystem 940 consists of a voltage regulator 942 and a controller circuit 944. The controller circuit 944 further comprises three parallel delay elements, delay T1 946, delay T2 948, and delay T3 950, and logic gates, NAND gate 952, OR gate 954 and AND gate 956.

In order to operate the controller circuit 944, a source voltage 958 is provided by a battery, for example, as a power source for the voltage regulator 942 which provides a supply voltage 960 to the controller circuit 944. The controller circuit 944 receives a power control signal 962 from a separate circuit that initiates a power up and a power down sequence of the particular load circuit under control of controller circuit 944. The power control signal 962 progresses through the three delay elements producing delay T1 signal 964, delay T2 signal 966, and delay T3 signal 968. The NAND gate 952 receives the power control signal 962 and the delay T3 signal 968 as inputs to produce a power reset signal 970, such as the power reset signal 224 of FIG. 2. The OR gate 954 receives the delay T1 signal 964 and the delay T2 signal 966 as inputs to produce a voltage regulator (Vreg) enable signal 972, such as the Vreg enable signal 226 of FIG. 2. The AND gate 956 receives the delay T1 signal 964 and the delay T2 signal 966 as inputs to produce a bypass signal 974, such as the bypass signal 230 of FIG. 2.

Figure 9C:
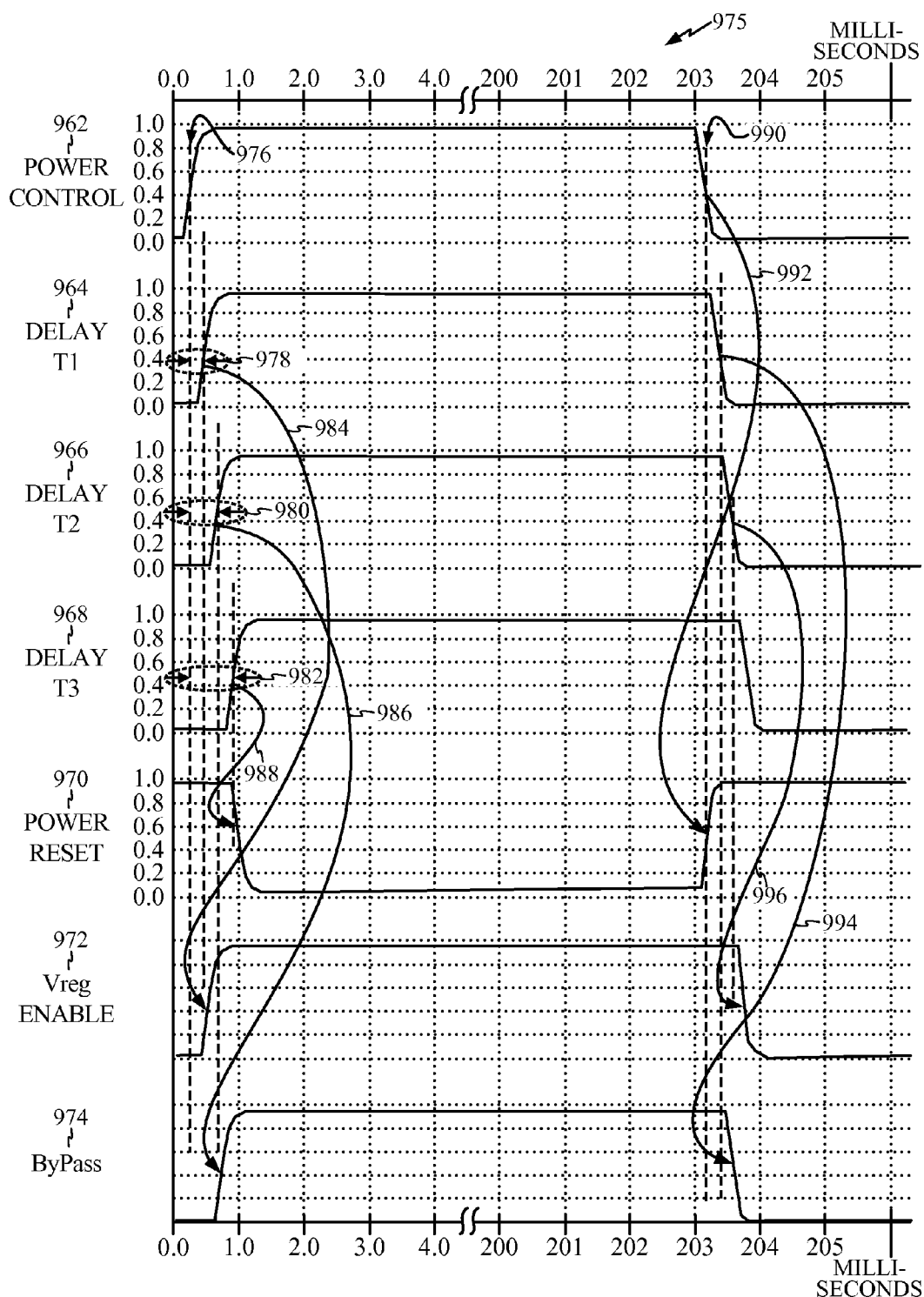
FIG. 9C illustrates an exemplary timing diagram of signal operations of the controller subsystem of FIG. 9A.

FIG. 9C illustrates an exemplary timing diagram 975 of signal operations of the controller subsystem 940 of FIG. 9B. In this example, the controller circuit 944 is powered up before, during and after a load circuit, such as load circuit 210, is powered on or has the power collapsed. The exemplary timing diagram 975 illustrates control signal operation during power up and during dynamic power collapse of a load circuit.

The power control signal 962 is asserted at timing point 976. After a time delay T1 978, the delay T1 signal 964 is asserted. After a time delay T2 980, the delay T2 signal 966 is asserted and after a time delay T3 982, the delay T3 signal 968 is asserted. The Vreg enable signal 972 is asserted in response to the delay T1 signal 964 as indicated by the relationship line 984. The bypass signal 974 is asserted in response to the delay T2 signal 966 as indicated by the relationship line 986. The power reset signal 970 is deactivated in response to the delay T3 signal 968 as indicated by the relationship line 988. In this exemplary timing diagram 975, the Vreg enable signal 972 is asserted first, followed by the bypass signal 974, and then the power reset signal 970 is deactivated. There are many variations on the time delay periods T1, T2, and T3 that would allow correct operation of the load circuit. For example, time delay T1 978 and time delay T2 980 could both be close to or equal to zero and the time delay T3 982 could be set to equal the time it takes the load supply voltage, such as the load supply voltage 232 of FIG. 2, to reach the normal operating voltage of the load circuit 210.

During a shut down scenario, the power control signal 962 is deactivated at timing point 990. The delay T1 signal 964, the delay T2 signal 966, and the delay T3 signal 968 are each delayed by a time delay T1 978, time delay T2 980, and time delay T3 982, respectively, following the deactivation of the power control signal 962. The power reset signal 970 is activated first as indicated by the relationship line 992. The bypass signal 974 is deactivated next as indicated by the relationship line 994 and the Vreg enable signal 972 is deactivated next as indicated by the relationship line 996. In this exemplary sequence, the load circuit enters into a reset state, as a controlled non-functional state, the bypass capacitors are decoupled from their discharge path, and the supply voltage is powered down. There are many variations on the time delay periods T1, T2, and T3 that would allow correct operation of the load circuit and conserving energy stored in the bypass capacitors. For example, the delay T2 980 could be set less than or equal to the time delay provided by delay T1 978, while still conserving power in the bypass capacitors. It is also noted that the load circuit is first placed into a reset state and following this the Vreg enable signal 972 and bypass signal 974 may be generated. In this alternative scenario, a Vreg enable time delay following the assertion of the power reset signal 970 may be used. In a similar manner, a bypass time delay following the assertion of the power reset signal 970 may also be used. The Vreg enable time delay and bypass time delay are related to the time delay T1 978 and the time delay T2 980, respectively, but of increased duration due to the NAND gate 952 of FIG. 9B or the NAND gate 912 of FIG. 9A. Since a NAND gate delay may be on the order of 50 picoseconds, such a delay increase may be considered negligible for the purposes of power sequencing timing.

Figure 10:
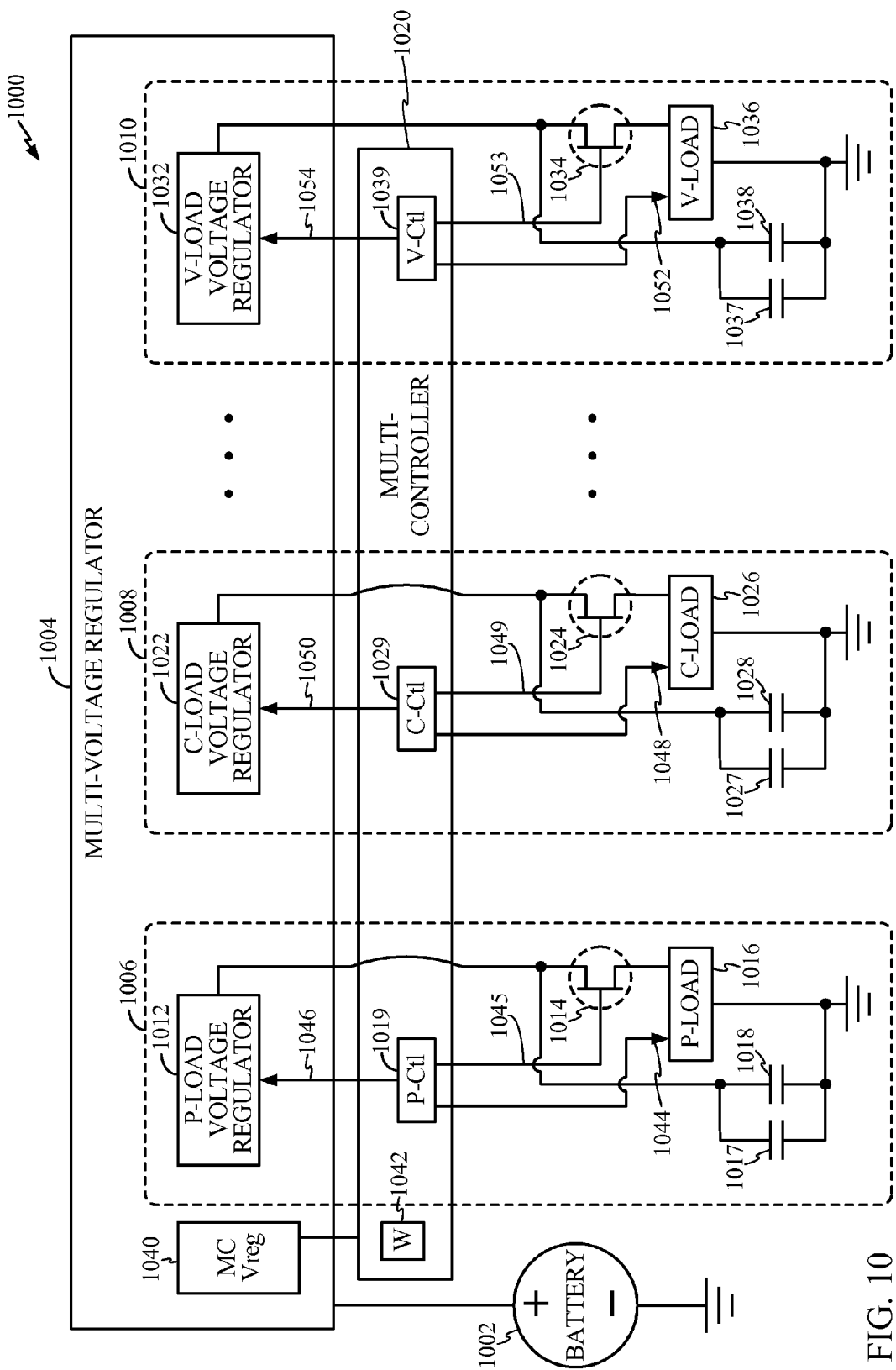
FIG. 10 is an exemplary embodiment of a multi-BCS circuit.

FIG. 10 is an exemplary embodiment of a multi-BCS circuit 1000. The multi-BCS circuit 1000 comprises a power source, such as battery 1002, a multi-voltage regulator circuit 1004 partitioned to support multiple BCS circuits, such as a processor BCS circuit 1006, a communication BCS circuit 1008, and a video BCS circuit 1010. The processor BCS circuit 1006 comprises a processor load (P-load) voltage regulator 1012, a processor bypass (Pbypass) transistor 1014, a P-load 1016, bypass capacitors 1017 and 1018, and a processor controller (P-Ctl) 1019 that is part of a multi-controller (MC) 1020. The communication BCS circuit 1008 comprises a communication load (C-load) voltage regulator 1022, a communication bypass (Cbypass) transistor 1024, a C-load 1026, bypass capacitors 1027 and 1028, and a communication controller (C-Ctl) 1029 that is part of the MC 1020. The video BCS circuit 1010 comprises a video load (V-load) voltage regulator 1032, a video bypass (Vbypass) transistor 1034, a V-load 1036, bypass capacitors 1037 and 1038, and a video controller (V-Ctl) 1039 that is part of the MC 1020. A multi-controller voltage regulator (MC Vreg) 1040 separate from the P-load, C-load, and V-load voltage regulators 1012, 1022, and 1032, respectively powers the MC 1020. While the processor BCS circuit 1006, the communication BCS circuit 1008, and the video BCS circuit 1010 are illustrated with a BCS circuit similar to the first BCS circuit 200 of FIG. 2, it is noted that the three illustrated BCS circuits of FIG. 10 share a common battery 1002 and that different embodiments of the BCS circuits may be used instead of or in addition to the one shown.

In operation, the P-Ctl 1019 generates a processor reset (Preset) signal 1044, a processor bypass (Pbypass) signal 1045, and a P-load voltage regulator enable (Penable) signal 1046, in a manner similar to the signal timing shown in the timing diagram 975 of FIG. 9C. The C-Ctl 1029 generates a communication reset (Creset) 1048, a communication bypass (Cbypass) signal 1049, and a C-load voltage regulator enable (Cenable) signal 1050, in a manner similar to the signal timing shown in the timing diagram 975 of FIG. 9C. Also, the V-Ctl 1039 generates a video reset (Vreset) 1052, a video bypass (Vbypass) signal 1053, and a V-load voltage regulator enable (Venable) signal 1054, in a manner similar to the signal timing shown in the timing diagram 975 of FIG. 9C.

A watchdog controller (W) 1042 that is separate from the BCS circuits is used to monitor the various loads and to generate power control signals for each load based upon feedback signals as generated in the system or within the various loads. For example, the video BCS circuit 1010 may be required to power up upon placing a device, such as remote unit 120 of FIG. 1 having the video BCS circuit in component 125A, into a video mode of operation. The video BCS circuit 1010 may also generate a separate signal to indicate that it is in an idle mode operation or that the video mode has been disabled on the remote unit 120, for example, and a power down may be appropriate to save power. Based upon such input, the watchdog controller 1042 may issue a power control signal, such as the power control signal 962 of FIG. 9B, to the V-Ctl 1039 initiating the required power up or power down sequencing. It is noted that the watchdog controller 1042 is powered from the MC Vreg 1040 allowing separate control of the power sequencing of each load.

Figure 11:
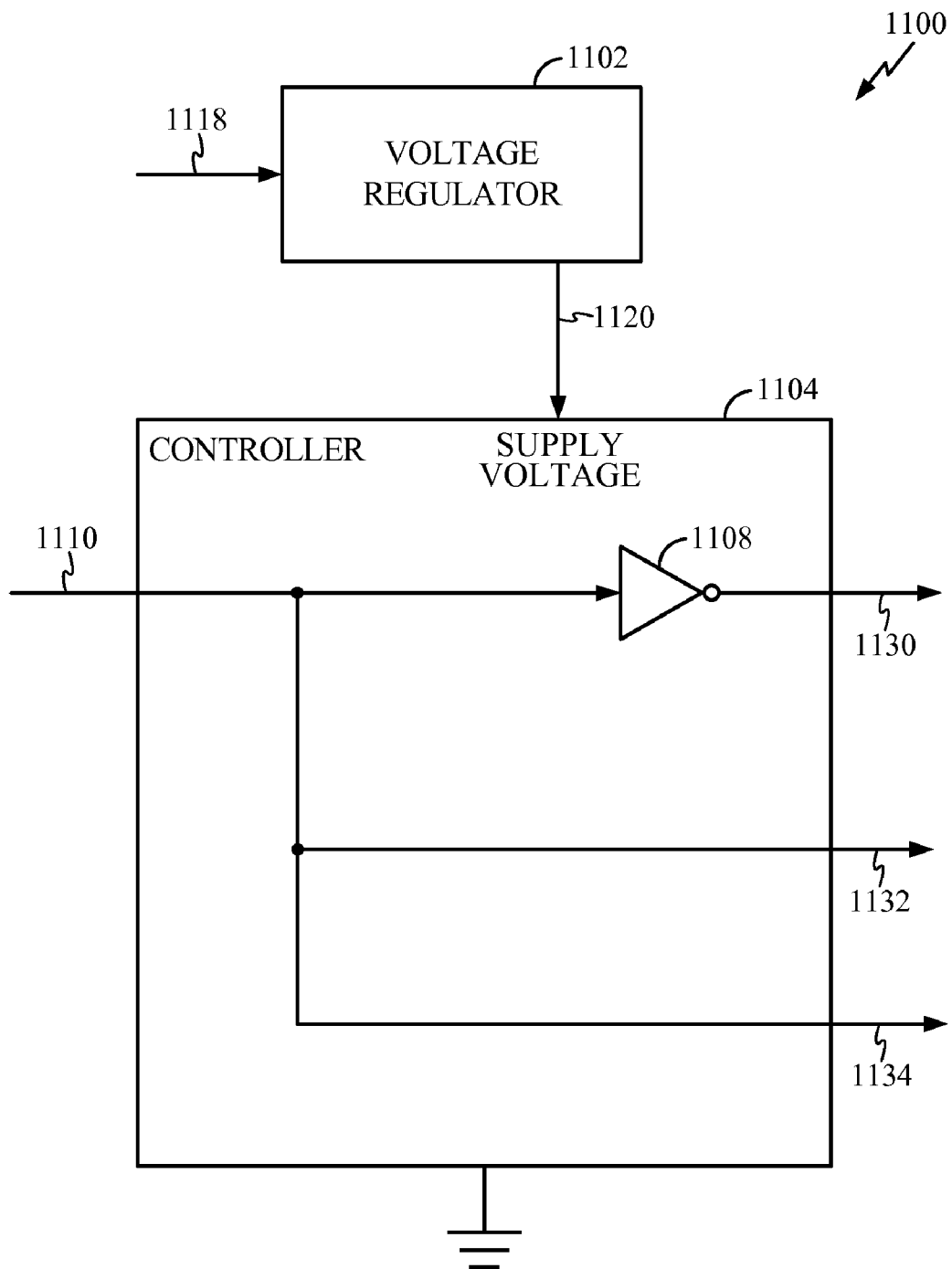
FIG. 11 is an exemplary third embodiment of a controller subsystem.

FIG. 11 is an exemplary third embodiment of a controller subsystem 1100. The third controller subsystem 1100 consists of a voltage regulator 1102 and a controller circuit 1104. The third controller subsystem 1100 is used in a system where a load circuit is able to tolerate a power reset signal 1130, a Vreg enable signal 1132, and a bypass signal 1134 transitioning at approximately the same time. The voltage regulator 1102 receives a source voltage 1118 and provides a supply voltage 1120. The controller circuit 1104 comprises an inverter 1108 to invert a power control signal 1110 to generate the power reset signal 1130. Also, the power control signal 1110 may be coupled to a Vreg enable signal input port on a voltage regulator that supplies power to the load circuit, such as the Vreg enable signal 1132. The power control signal 1110 may also be coupled to a bypass signal input port of a switch that couples bypass capacitors to the load circuit, such the bypass signal 1134. The Vreg enable signal 1132 and the bypass signal 1134 may thereby transition at approximately the same time as the power reset signal 1130 within one or two gate delays of each other. It is further realized that for load circuits that are able to specify the power reset signal to be of opposite polarity than as shown, for example, with power reset 970 of FIG. 9C, then the inverter 1108 would not be necessary. Such a specification for a power reset signal may be obtained by buffering and inverting the power control signal 1110 within the load circuit and then used internally as a power reset signal. In another example, a system may be made up of multiple load circuits and BCS circuits as shown in FIG. 10. In such a multiple load and BCS circuits system, one of the loads may be specified to use the third controller subsystem 1100 or alternatively, use the power control signal in place of the power reset signal 1130, the Vreg enable signal 1132, and the bypass signal 1134.

Figure 12:
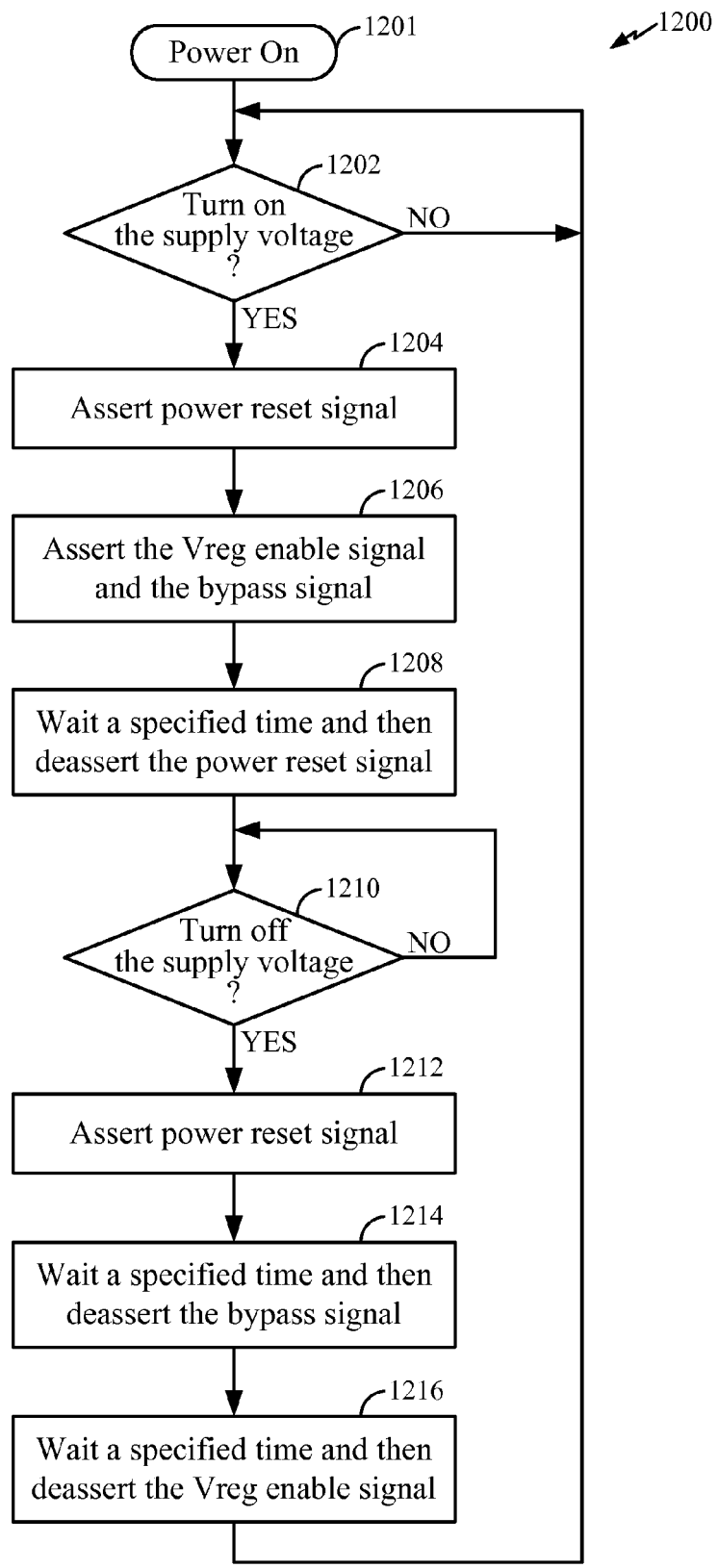
FIG. 12 is flow chart of operations for a BCS circuit.

FIG. 12 is flow chart 1200 of operations for a BCS circuit, such as the BCS circuit 200 of FIG. 2. References to the components of FIG. 2 and time periods in the timing diagram 400 of FIG. 4 are made in describing an exemplary sequence of operations for the BCS circuit 200. At block 1201, a device, such as a remote unit 120 of FIG. 1 containing the BCS circuit 200, is turned on when a power switch on the remote unit 120 is pressed. At decision block 1202, the controller 216 determines whether to turn on the load supply voltage 232 to the load circuit 210. If the voltage is not ready to be turned on, the controller 216 waits until it is determined that the load supply voltage 232 can be turned on. At block 1204, the power reset signal 224 is asserted holding the load circuit 210 in reset until the load supply voltage 232 reaches a normal operational level. At block 1206, the Vreg enable signal 226 and the bypass signal 230 are asserted. At block 1208 and after a specified time, such as the period of time 402 of FIG. 4, the power reset signal 224 is turned off. At this point, the load circuit 210 is operational.

At block 1210, the controller 216 determines whether to turn off the load supply voltage 232. For example, power may be cycled off upon completion of a task with no further pending work for the load circuit 210. If the voltage is not to be turned off, the controller 216 waits until it is determined that the load supply voltage 232 should be turned off. At block 1212, the power reset signal 224 is asserted to hold the load circuit 210 in reset state while the load supply voltage 232 is turned off. At block 1214 and after a specified time, such as the period of time 406, the bypass signal 230 is turned off. At this point, the load circuit 210 has been decoupled from the bypass capacitors 212 and 214, decoupling the bypass capacitors' discharge path and advantageously conserving the energy stored in the bypass capacitors. At block 1216 and after a specified time, such as the second period of time 408, the Vreg enable signal 226 is turned off. At this point, the supply voltage 222 has been decoupled from the voltage regulator 206. Returning to block 1202, the conserved energy in the bypass capacitors is available when it is determined to turn the supply voltage on to the load circuit 210.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of a portable unit having a battery supply, it will be recognized that a wide variety of implementations, such as conserving bypass capacitor energy on electronic devices may be employed using the techniques of the invention by persons of ordinary skill in the art consistent with the above discussion and the claims which follow below.

What is claimed is:

1. An apparatus to save power in a portable device comprising:
    a bypass capacitor;
    a power source having an output supply voltage that is switchable;
    a load circuit of the portable device coupled to the output supply voltage and the bypass capacitor operable to filter the output supply voltage;
    a transistor switch operable to decouple a discharge path of the bypass capacitor through the load circuit when the transistor switch is disabled; and
    a controller operable to assert a power reset signal to the load circuit to hold the load circuit in a reset state and to turn off the output supply voltage and the transistor switch in order to conserve energy stored in the bypass capacitor.

2. The apparatus of claim 1 wherein the transistor switch is coupled between the load circuit and the output supply voltage from the power source and controllably coupled to the controller.

3. The apparatus of claim 1 wherein the transistor switch is coupled between the bypass capacitor and the output supply voltage and controllably coupled to the controller.

4. The apparatus of claim 1 wherein the transistor switch is coupled between the load circuit and ground and controllably coupled to the controller.

5. The apparatus of claim 1 wherein the transistor switch is coupled between the bypass capacitor and ground and controllably coupled to the controller.

6. The apparatus of claim 1 wherein the power source controls the output supply voltage to limit in rush current to the load circuit and bypass capacitor.

7. The apparatus of claim 1 wherein the controller is powered from a voltage source separate from the output supply voltage.

8. The apparatus of claim 1 wherein the power source is a voltage regulator which receives an input voltage from a battery or a voltage supply external to the portable device wherein the input voltage is at the same voltage level as a recharged battery.

9. A method of conserving energy stored in a bypass capacitor of a load circuit in an electronic device, the method comprising:
    asserting a first signal to the load circuit to hold the load circuit in a reset state, the first signal generated by a controller;
    disabling a voltage source used to supply a voltage to the load circuit after a first period of time following the asserting of the first signal; and
    decoupling the bypass capacitor from the load circuit after a second period of time following the asserting of the first signal to minimize the discharging of the bypass capacitor through the load circuit, wherein energy stored in the bypass capacitor is conserved.

10. The method of claim 9 wherein the coupling between the bypass capacitor and the load circuit is disabled based on a bypass signal generated by the controller.

11. The method of claim 9 wherein the voltage source is turned off based on a voltage regulator enable signal generated by the controller.

12. The method of claim 9 wherein the first period of time is greater than or equal to the second period of time.

13. The method of claim 9 wherein both the first period of time and the second period of time are approximately equal to zero within one or two gate delays of each other.

14. The method of claim 9 wherein the first period of time is less than or equal to the second period of time.

15. The method of claim 9 further comprising:
    enabling the voltage source used to supply the voltage to the load circuit; and
    switching on the coupling between the bypass capacitor and the load circuit, wherein the bypass capacitor requires minimum recharging based on the energy conserved in the bypass capacitor.

16. The method of claim 15 wherein the coupling between the bypass capacitor and the load circuit is enabled at the same time the voltage source is enabled.

17. A method for conserving energy stored in a plurality of bypass capacitors associated with a plurality of power domains of circuitry in a portable device, the method comprising:
    generating one or more power down events separately for one or more power domains;

holding the one or more power domains to be powered down in a controlled non-functional state based on one or more power reset signals generated by a respective controller in each of the one or more power domains in response to a power down event;

decoupling bypass capacitors associated with the one or more power domains to be powered down from their associated load; and disabling a supply voltage to the one or more power domains to be powered down.

18. The method of claim 17 further comprising:

waiting a first time period after the power down event to decouple the bypass capacitors; and waiting a second time period after the power down event to disable the supply voltage.

19. The method of claim 18 wherein the first time period is less than or equal to the second time period.

20. The method of claim 17 further comprising:

monitoring the status of the portable device for an asserted power down indicator indicating that a power down of a power domain can occur; and generating a power down event to initiate the power down of a power domain in response to an asserted power down indicator.

* * * * *

UNITED STATES PATENT AND TRADEMARK OFFICE
CERTIFICATE OF CORRECTION

| | | |
|---|---|---|
| PATENT NO. | : 7,772,721 B2 | |
| APPLICATION NO. | : 11/866736 | |
| DATED | : August 10, 2010 | |
| INVENTOR(S) | : Michalak | |

It is certified that error appears in the above-identified patent and that said Letters Patent is hereby corrected as shown below:

Column 14, line 10, claim 20: "a power domain" to read as --the power domain--

Signed and Sealed this
Nineteenth Day of July, 2011

David J. Kappos
*Director of the United States Patent and Trademark Office*